United States Patent [19]
Hegler

[11] Patent Number: 5,992,469
[45] Date of Patent: Nov. 30, 1999

[54] COMPOSITE PIPE WITH INTEGRAL SOCKET

[76] Inventor: Ralph Peter Hegler, Schillerstrasse 7, D-97688, Bad Kissingen, Germany

[21] Appl. No.: 09/083,845

[22] Filed: May 22, 1998

[30] Foreign Application Priority Data

Jun. 9, 1997 [DE] Germany .......................... 197 24 113

[51] Int. Cl.[6] ................ F16L 9/16; F16L 11/00
[52] U.S. Cl. .......................... 138/109; 138/141
[58] Field of Search ................... 264/508, 504, 264/511; 138/109, 121, 155

[56] References Cited

U.S. PATENT DOCUMENTS

| | | | |
|---|---|---|---|
| 4,110,144 | 8/1978 | Buehler et al. | 138/109 |
| 4,362,187 | 12/1982 | Harris et al. | 138/109 |
| 4,779,651 | 10/1988 | Hegler et al. | 264/511 |
| 4,819,970 | 4/1989 | Umehara | 138/121 |
| 5,320,797 | 6/1994 | Hegler et al. | 138/109 |
| 5,348,051 | 9/1994 | Kallenbach | 138/155 |
| 5,405,569 | 4/1995 | Lupke | 264/504 |
| 5,472,659 | 12/1995 | Hegler et al. | 264/508 |
| 5,609,713 | 3/1997 | Kime et al. | 138/109 |
| 5,803,132 | 9/1998 | Lupke | 138/121 |

FOREIGN PATENT DOCUMENTS

| | | |
|---|---|---|
| 0108598B1 | of 0000 | European Pat. Off. . |
| 0385465A2 | of 0000 | European Pat. Off. . |
| 0595742B1 | of 0000 | European Pat. Off. . |
| WO95/01251 | of 0000 | WIPO . |

OTHER PUBLICATIONS

German Search Report.

*Primary Examiner*—Andres Kashnikow
*Assistant Examiner*—Davis Hwu
*Attorney, Agent, or Firm*—Robert F. I Conte, Lee, Mann, Smith, McWilliams, Sweeney & Ohlson

[57] ABSTRACT

A composite pipe comprising a corrugated external pipe and a smooth internal pipe possesses a socket which, at its bottom, adjoins the internal pipe and the external pipe by an expanded section. Subsequent to the expanded section, the socket comprises a smooth-walled and substantially single-walled section which is again followed by a composite pipe section having an internal pipe section and an external pipe section with at least two annular corrugation crests.

11 Claims, 6 Drawing Sheets

COMPOSITE PIPE WITH INTEGRAL SOCKET

BACKGROUND OF THE INVENTION

1. Field of the Invention

The invention relates to a composite pipe with an integral socket applied by injection-molding.

2. Background Art

EP 0 108 598 B1 teaches to provide the portions of composite pipes which are to form a pipe socket with a smooth-walled external-pipe section and a smooth-walled internal-pipe section which are not united. For the production of a socket, the internal-pipe section is cut out subsequently. This socket is not dimensionally stable. This method is complicated and has not been successful in practice.

It is known from U.S. Pat. No. 5,320,797, in the area where a socket is to be formed, to combine the two streams of plastic melt which constitute the external tube and the internal tube, a socket thus being produced in-line. By simultaneous reduction of the advance speed of the mold that serves for the manufacture of the composite pipe, more plastic material per unit length of the pipe is supplied to the portion of the socket so that the socket exhibits a higher vertex resistance to pressure than in case the amount per unit length of plastic material had not been increased.

A similar method is known from the more recent WO95/01251.

U.S. Pat. No. 4,779,651 teaches a composite pipe having a socket molded on in-line, in which annular elevations elastically deformable radially inwards are formed on the corrugations crests for the purpose of compensation of tolerances. In the vicinity of its insertion section, the socket is provided with an outer crimp which reinforces the annular rigidity.

It is known from EP 0 595 742 B1 to assemble composite pipes by means of a kind of a slide lock. In this case, one pipe section at a time is provided with a socket which is likewise a composite pipe.

EP 0 385 465 A2 teaches subsequently to provide a composite pipe with a socket by one end being expanded. The corrugation crests of the external pipe are flattened.

A basic problem of all the sockets injection-molded on composite pipes resides in that the socket are not always sufficiently dimensionally stable. This is due to the fact that composite pipes obtain their rigidity from the special box-type profile of the composite pipe and not from the thickness of the wall material. The known integral sockets lack this structure. Minor improvement is attained by the mentioned reinforcing crimps in the vicinity of the insertion section of a socket. Moreover, composite pipes having the known sockets of greater nominal widths cannot be produced without any problems, because cooling problems will occur. Since, conditioned by construction, the wall thicknesses of the external pipe as well as of the smooth internal pipe will increase when the nominal width of the composite pipes increases, discharge of the energy stored in the plastic melt will no longer take place during in-line injection-molding of a socket neither outwards via the shells nor inwards via the cooled caliber. The reason why this concerns the sockets resides in that, in the vicinity of the socket to be produced, the internal tube is no longer in contact with the caliber, which results in that either the manufacturing rate must be reduced strictly with the nominal widths of the composite pipes to be manufactured growing, or that the socket molded on in-line is not formed accurately and does not conform to tolerances. These drawbacks cannot be tolerated in particular in the case of drain and/or storm water pipes, on which high demands are put, regarding the leak-proofness of a socket connection.

SUMMARY OF THE INVENTION

It is an object of the invention to embody a composite pipe with an integral socket in such a way that high dimensional stability of the socket on the one hand and high constancy of tolerance on the other are attained inside the socket, and to specify a method for the manufacture of such a composite pipe.

According to the invention, this object is attained in a composite pipe comprising a smooth internal pipe; an external pipe alternately provided with annular corrugation crests and annular corrugation troughs, the internal pipe and the external pipe being welded together at the bottom of the corrugation troughs, forming a pipe section; and a socket, which is formed at one end of a pipe section, and which at its bottom, adjoins the internal pipe and the external pipe of the pipe section by an expanded section, and which subsequent to the expanded section, comprises a smooth-walled and substantially single-walled section, and which subsequent to the smooth-walled section, is formed as a composite pipe section having an internal pipe section and an external pipe section with at least two annular corrugation crests, and which subsequent to the composite pipe section, comprises an inlet. The socket becomes very rigid due to the fact that the socket, over part of its length, is in the form of a composite-pipe section, i.e. having corrugation crests and an internal pipe section. On the other hand the smooth-walled and single-walled section can be manufactured to be extremely true to shape, thus having high constancy of tolerance. This is where the centering and/or leak-tight assembly of two pipe sections takes place.

The smooth-walled and substantially single-walled section has a length in the direction of the central longitudinal axis which corresponds at least to the length of one and a half corrugation crests and a corrugation trough of the pipe section in the direction of the central longitudinal axis. This reflects the minimum length of the smooth-walled and single-walled section. When the smooth-walled and single-walled section is cylindrical, centering takes place between a spigot and the smooth-walled and single-walled part. When the smooth-walled and single-walled section widens conically from the composite pipe section to the expanded section, this specifies how to obtain even a non-extractable plug-in connection in the socket.

Further features, advantages and details of the invention will become apparent from the ensuing description of an exemplary embodiment, taken in conjunction with the drawing.

DESCRIPTION OF THE PREFERRED EMBODIMENT

Figure 1:
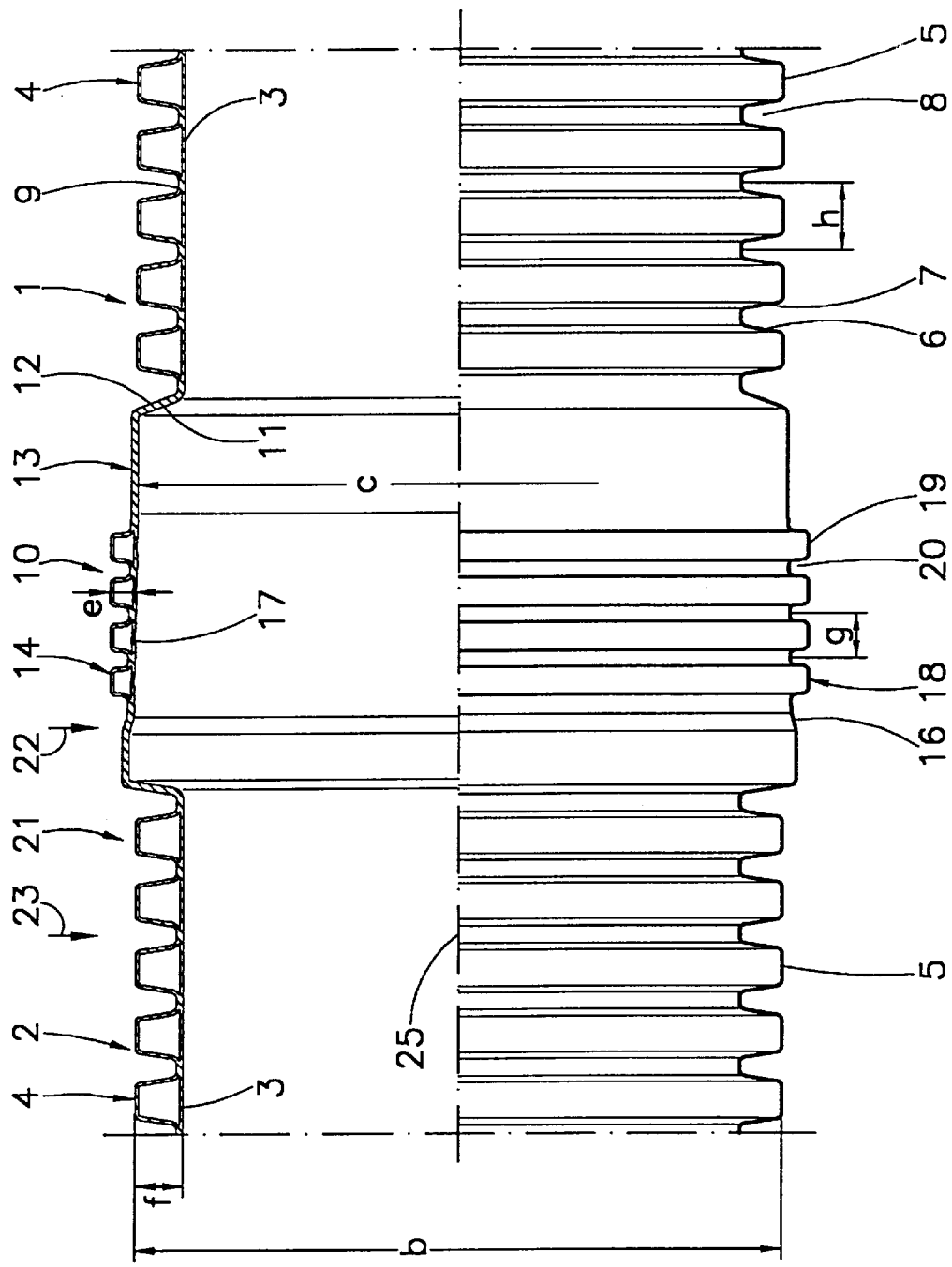
FIG. 1 is a lengthwise sectional view of a composite pipe which is produced continuously from a pipe section, a socket and a pipe section.

As seen in FIG. 1, a composite pipe is continuously produced, forming a pipe strand, which substantially consists of the virtual pipe sections 1, 2. These generally possess a smooth-walled, cylindrical internal pipe 3 and a corrugated external pipe 4. This external pipe comprises trapezoidal corrugation crests 5, a corrugation trough 8 being formed between two flanks 6, 7 of two neighboring corrugation crests 5. At the bottom 9 of the corrugation trough 8, the external pipe 4 and the internal pipe 3 are welded together. Composite pipes of this type and structure are generally known and widely spread in practice.

Figure 2:
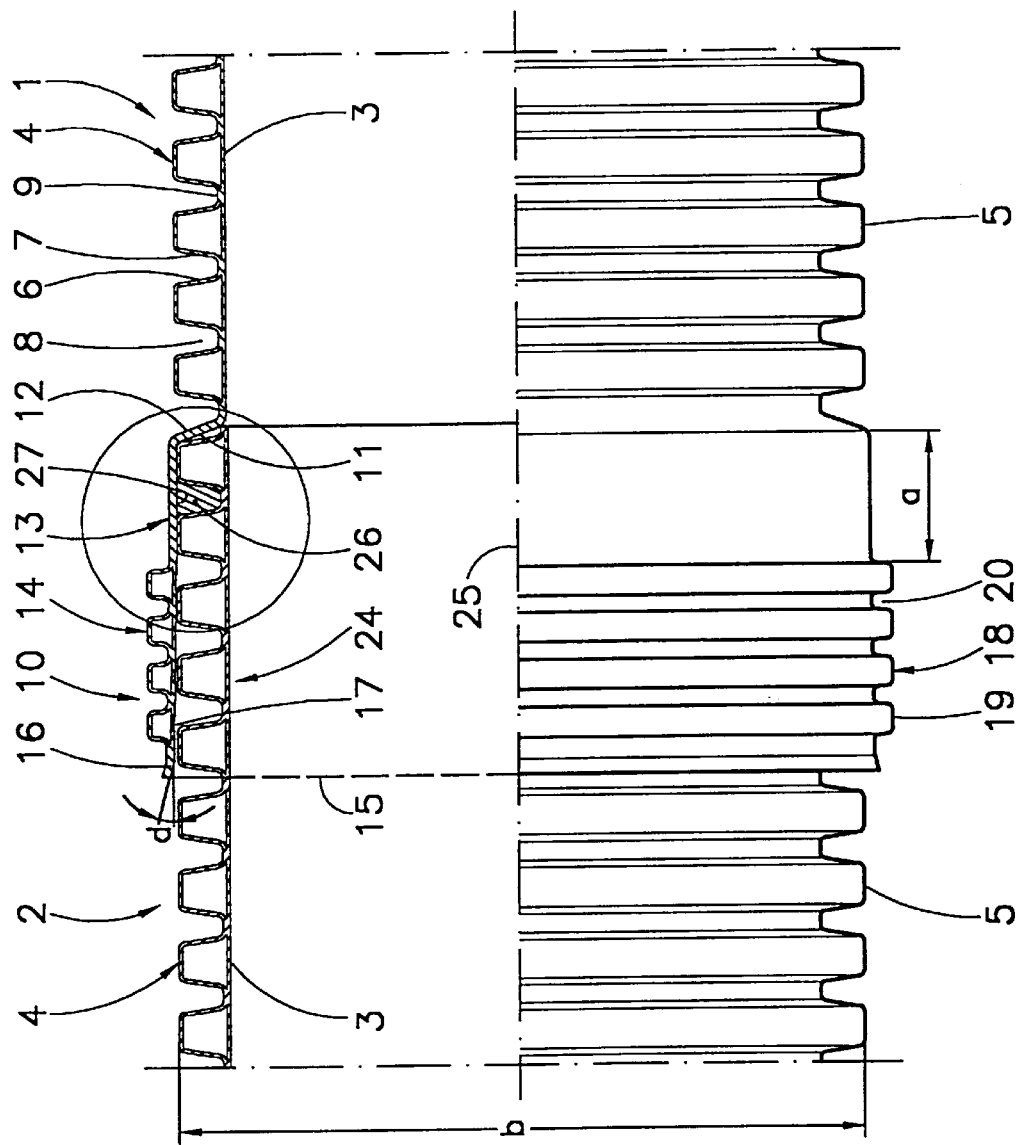
FIG. 2 is an illustration of a pipe connection with a socket embodied according to the invention.

Formed between the two pipe sections 1, 2 is a socket 10 which, in the vicinity of the socket bottom 11, i.e. subsequent to an expanded section 12 of the pipe section 1, possesses a smooth-walled section 13 which is cylindrical in the embodiment according to FIGS. 1 and 2. This smooth-walled section 13, same as the expanded section 12, is not double-walled but predominantly single-walled. The smooth-walled section 13 is again followed by a composite pipe section 14, after which the socket 10 is again single-walled, namely by an insertion section 16 which expands conically outwards towards the inlet 15. Fundamentally, the composite pipe section 14 is structured in the same way as the pipe sections 1 and 2, i.e. it exhibits a substantially cylindrical internal pipe section 17 and a corrugated external pipe section 18 with corrugation crests 19, the external pipe section 18 and the internal pipe section being welded together in the vicinity of the corrugation troughs 20. Provision is made for at least two—four in the case illustrated—of these corrugation crests 19.

Located between the insertion section 16 and the pipe section 2 is a transition section 21 which is cut out as waste by two saw cuts 22, 23. As seen in FIG. 2, the end illustrated in the drawing of the pipe section 2 serves as a spigot 24 which is inserted into the socket 10 of a neighboring pipe section 1, two pipe sections 1, 2 thus being united.

As seen in FIG. 2, the smooth-walled section 13 of the socket 10 extends over a length a in the direction of the central longitudinal axis 25 of the pipe sections 1, 2 and the socket 10, this length a being equal to or greater than one and a half—two in the case illustrated—neighboring corrugation crests 5 plus the corrugation trough 8 located between them. This ensures that a seal 26 disposed between the two corrugation crests 5 bears against the inside wall 27 of the internal pipe section 17 and that the spigot 24, by its two corrugation crests 5 defining the seal 26, is centered in the smooth-walled section 13. In this embodiment, the outside diameter b of the pipe sections 1, 2 is only slightly smaller than the inside diameter c of the section 13. $1.020 \geq c/b \geq 1.001$ applies. As seen in particular in FIG. 2, in the case of a cylindrical design of the smooth-walled section 13, the internal pipe section 17 of the composite pipe section 14 may widen slightly conically from the smooth-walled section 13 towards the insertion section 16, namely by half an aperture angle d of 5° to 15°. The corrugation crests 19 and the corrugation troughs 20 of the composite pipe section 14 of the socket 10 are smaller than the corrugation crests 5 and the corrugation troughs 6 of the pipe sections 1, 2. As regards the height e of the corrugation crests 19 radial to the axis 25, i.e. over the internal pipe section 17, in relation to the height f of the corrugation crests 5 radial to the axis 25, equally over the internal pipe 3, $0.1 \, f \leq e \leq 0.6 \, f$ applies. As regards the spacing g of the corrugation crests 19 of the external pipe section 18 of the composite pipe section 14 in relation to the spacing h of the corrugation crests 5 of the pipe sections 1, 2 in the direction of the axis 25, $0.2 \, h \leq g \leq 0.8 \, h$, the spacing being measured from the center of a corrugation trough 8 and 20, respectively, to the center of the neighboring corrugation trough 8 and 20.

Figure 3:
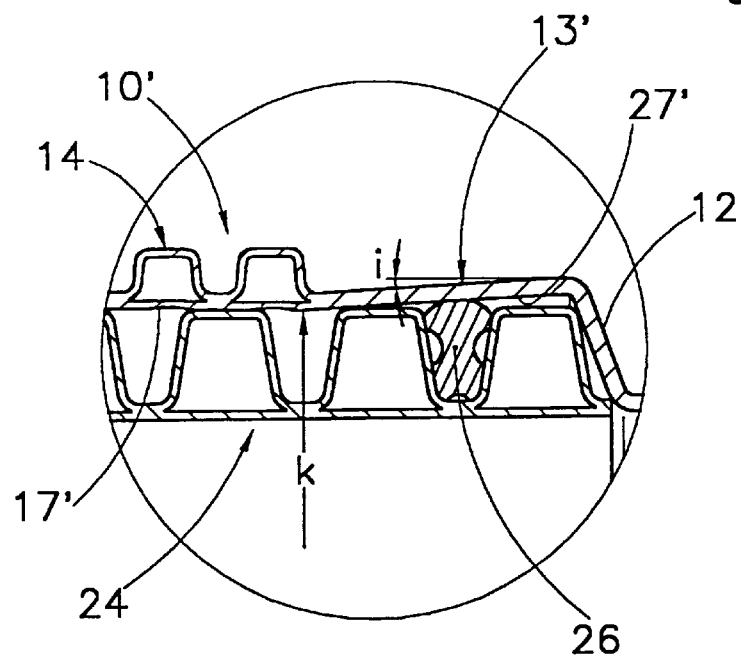
FIG. 3 is a partial section of FIG. 2 with a socket in a modified embodiment.

As seen in FIG. 3, the smooth-walled section 13' may be slightly conical, i.e. in the shape of a truncated cone, widening from the composite pipe section 14 towards the expanded section 12 by half an aperture angle i, to which $0° < i < 5°$ applies. In this case, the relation specified above for the inside diameter c of the smooth-walled section 13 applies to the smallest inside diameter k of the internal pipe section 17'. The seal 26 inserted in this case expands—as seen in FIG. 3—beyond the outer circumference of the neighboring corrugation crests 5 and bears against the slightly conical inside wall 27' of the section 13'. This design ensures that the seal itself serves as a safeguard against two pipe sections 1, 2 which are connected with each other coming apart, since the seal 26' would have to be compressed for the pipe sections 1, 2 to be moved apart.

Figure 4:
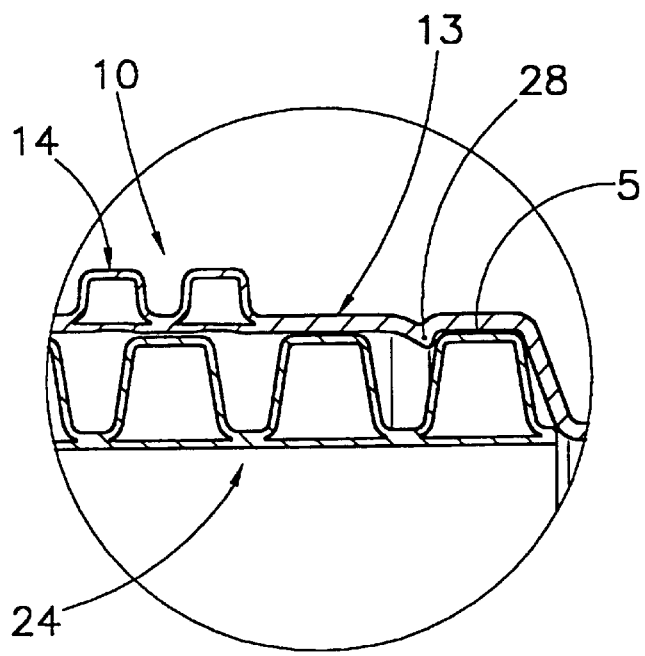
FIG. 4 is a partial section of FIG. 2 with another modified embodiment of a socket.

The embodiment according to FIG. 4 substantially corresponds to that of FIGS. 1 and 2, which is why reference can be made to the above description with corresponding reference numerals being used. In this case no seal is inserted, the smooth-walled section 13 instead being provided with catching cams 28 which project inwards radially to the axis 25 and lock into place for instance behind the first corrugation crests 5 of the spigot 24.

Figure 5:
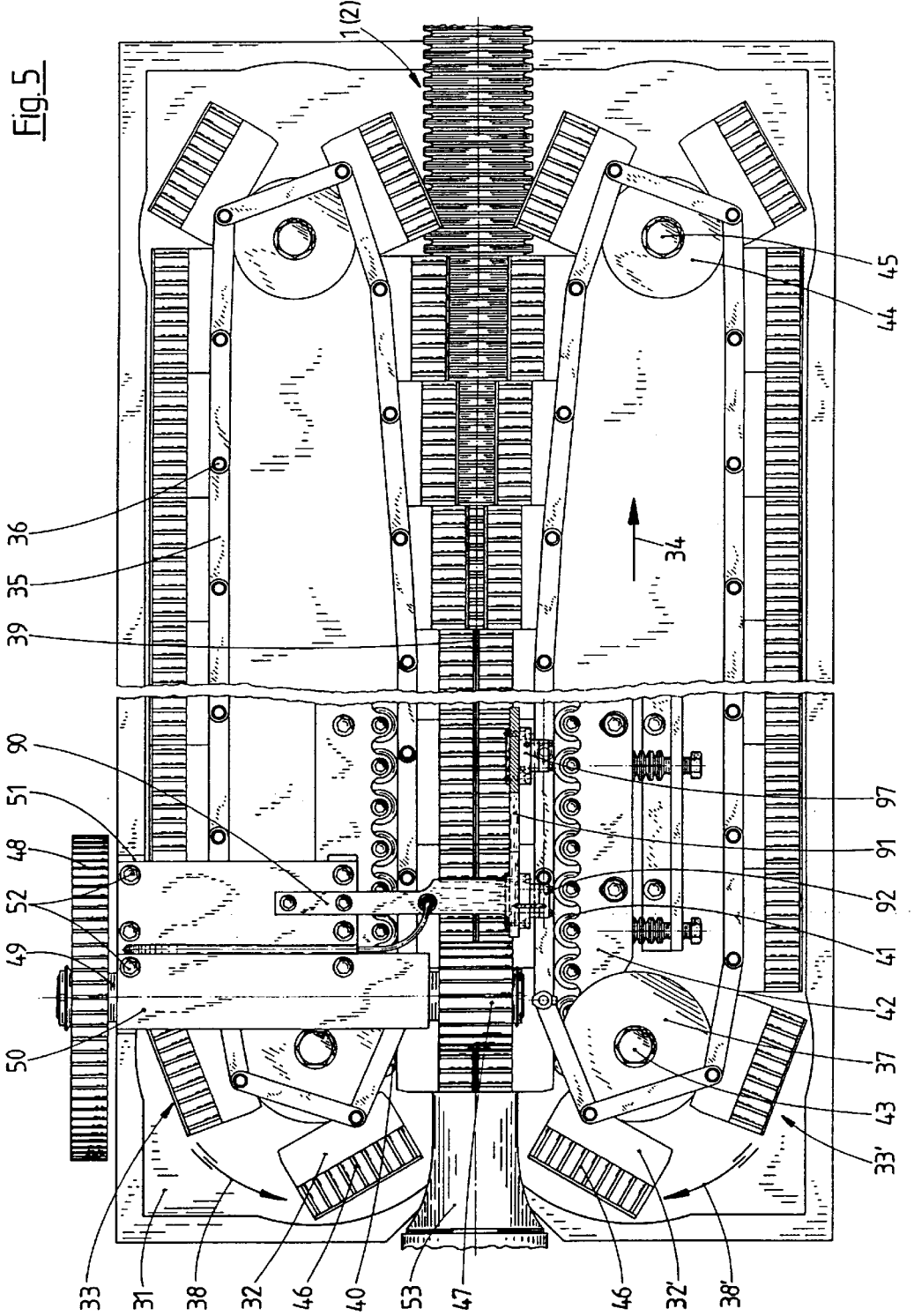
FIG. 5 is a plan view of an apparatus for the manufacture of plastic composite pipes.

The manufacture of the composite pipe with the socket 10, 10' embodied according to the invention takes place on an apparatus as basically known from U.S. Pat. 5,320,797. As seen in FIG. 5, an apparatus for the production of plastic composite pipes with transverse grooves comprises a machine bed 31 on which half shells 32 and 32' are disposed which are joined to each other, forming two so-called chains 33 and 33'. To this end, a fish plate 35 is articulated to the exterior front portion, seen in the direction of production 34, of each half shell 32 and 32' by means of a coupling bolt 36, this fish plate 35 being articulated to the corresponding portion of an ensuing half shell 32 and 32' likewise by means of a coupling bolt 36. By their rear end, seen in the direction of production 34, the chains 33, 33' thus formed are guided along so-called feed rollers 37 which serve as deflection wheels. When the chains 33, 33' circulate, the individual half shells 32, 32' are moved into a molding path 39 corresponding to the arrows 38 and 38', where two half shells 32, 32' at a time are united to form a pair of shells, successive pairs of shells in the direction of production 34 lying close together. For rapid closing of the half shells 32, 32' into a position in which they are parallel and contiguous to each other, so-called closing rollers 40 are provided, accelerating the joining of the rear ends, seen in the direction of production 34, of the half shells 32, 32'.

On the molding path 39 itself, the half shells 32, 32' adjoining each other are pressed against each other by guide rollers 41 which are rotatably mounted in guide rails 42. The feed rollers 37 are mounted on the machine bed 31 for rotation about axle ends 43. At the front end, seen in the direction of production 34, of the machine bed 31, return rollers 44 are mounted for rotation about axle ends 45, likewise serving as deflection wheels around which the chains 33 and 33' are deflected and returned to the feed rollers 37. As seen in FIG. 5, the guide bars 42 together with the guide rollers 41 end before the return rollers 44 by the length of several half shells 32 and 32' so that the half shells 32 and 32' may again be moved apart parallel to each other and crosswise to the direction of production 34 before being deflected by the return rollers 44.

A indentation 46 is provided on the top side of the half shells 32, 32', the two indentations 46 of the half shells 32, 32' allocated to each other by twos being in alignment so that a common driving pinion 47 can engage from above in this indentation 46, moving the half shells 32, 32' situated in the molding path 39 as a closed mold through the molding path 39. The drive of this driving pinion 47 is generally effected by a motor (not shown) via a driving gear 48 which is non-rotatably fixed on a shaft 49 which is provided with the driving pinion 47. The shaft 49 is run in a bearing 50 which is supported by spacers 51 relative to the machine bed 31 and is tightly fixed to the latter by screws 52.

The plastic composite pipes described above are manufactured on the apparatus specified, only a pipe section 1 and 2, respectively, being illustrated.

An extruder is provided for the manufacture of the composite pipes, of which only an injection head 53 is roughly outlined in FIG. 5. According to FIGS. 6 and 7, the injection head 53 comprises an internal die land 54 and an external die land 55. Further, an external die jacket 57 is provided likewise concentrically of the common central longitudinal axis 56 of the injection head 53. Between them, the internal die land 54 and the external die land 55 define an internal channel 58, whereas the external die land 55 and the external die jacket 57 define an external channel 59 between them.

The internal die land 54 is provided with a duct 60 which is concentric of the axis 56 and through which supply tubes are guided, of which only one supply tube 61 is relevant to this description. Further, gas ducts 62, which extend in the direction of production 34, are formed in the external die land 55.

Mounted on the internal die land 54 is an internal die plate 63, which widens in the shape of a truncated cone in the direction of production 34 and behind which an internal land is disposed, serving as a caliber 64. On the inner side radial to the axis 56, this internal die plate 63 defines an internal die 65 which terminates the internal channel 58. An extension piece 66 is mounted on the external die land 55 by means of a thread connection 67; seen in the direction of production 34, it partially encloses the internal die plate 63 and thus an expanded portion of the internal channel 58 on the outside as far as before the internal die 65. On the radially outer side, the latter is defined by means of an internal die ring 68 which is disposed on the extension piece 66 and serves for setting the width of the internal die 65.

The internal die plate 63 is disposed on a support pipe 69 which is concentric of the axis 56 and which is connected with the internal die land 54 by means of a thread connection 70. Mounted on the support pipe 69 is an adjusting device 71 which bears against the internal die plate 63 and by means of which the internal die plate 63 can be adjusted. Also the caliber 64 is mounted on the support pipe 69.

An external die ring 72 is adjustably disposed on the external die jacket 57 so that the width of an external die 73 which terminates the external channel 59 can be adjusted.

The gas ducts discharge from the injection head 53 between the external die 73 and the downstream internal die 65 seen in the direction of production 34.

The caliber 64 comprises a substantially cylindrical sizing cylinder 74 of customary design which, on its inside, is provided with a temperature-regulating channel 75 to which a temperature control medium is supplied in a manner not shown in detail by way of one of the supply tubes. The sizing cylinder 74 is hollow, having a gas chamber 76 inside which surrounds the support pipe 69 and is connected with the supply tube 61. By way of a split gas duct 77 which is formed in the parting plane between the internal die plate 63 and the caliber 64, the gas chamber 76 is connected with the molding chamber 78 which is formed between the half shells 32 and 32' and the injection head 53 with the caliber 64. The split gas duct 77 opens into the molding chamber 78 directly behind the internal die 65 seen in the direction of production 34.

Figure 6:
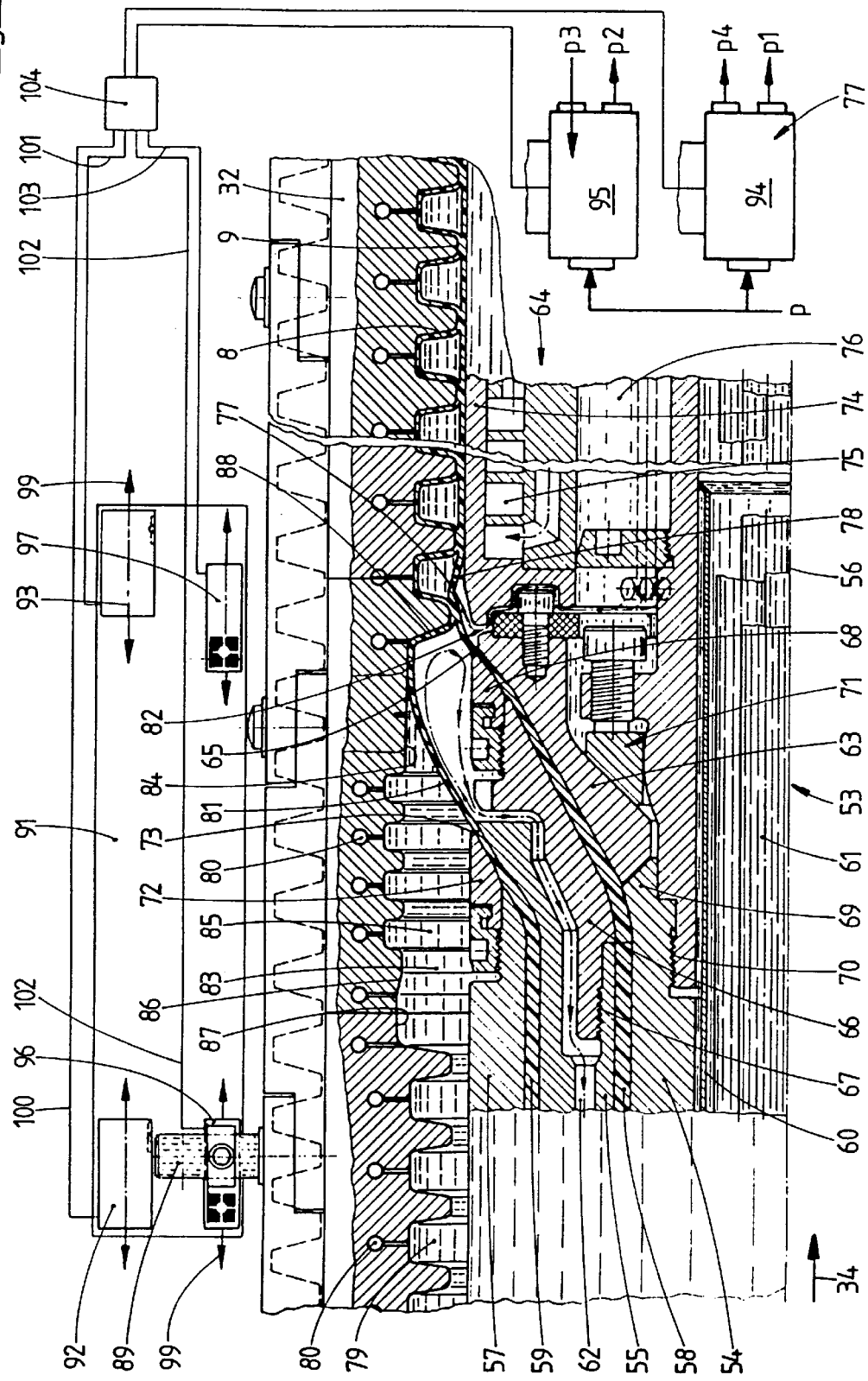
FIG. 6 is a lengthwise section through part of the apparatus at the beginning of the production of a socket on a composite pipe.
Figure 7:
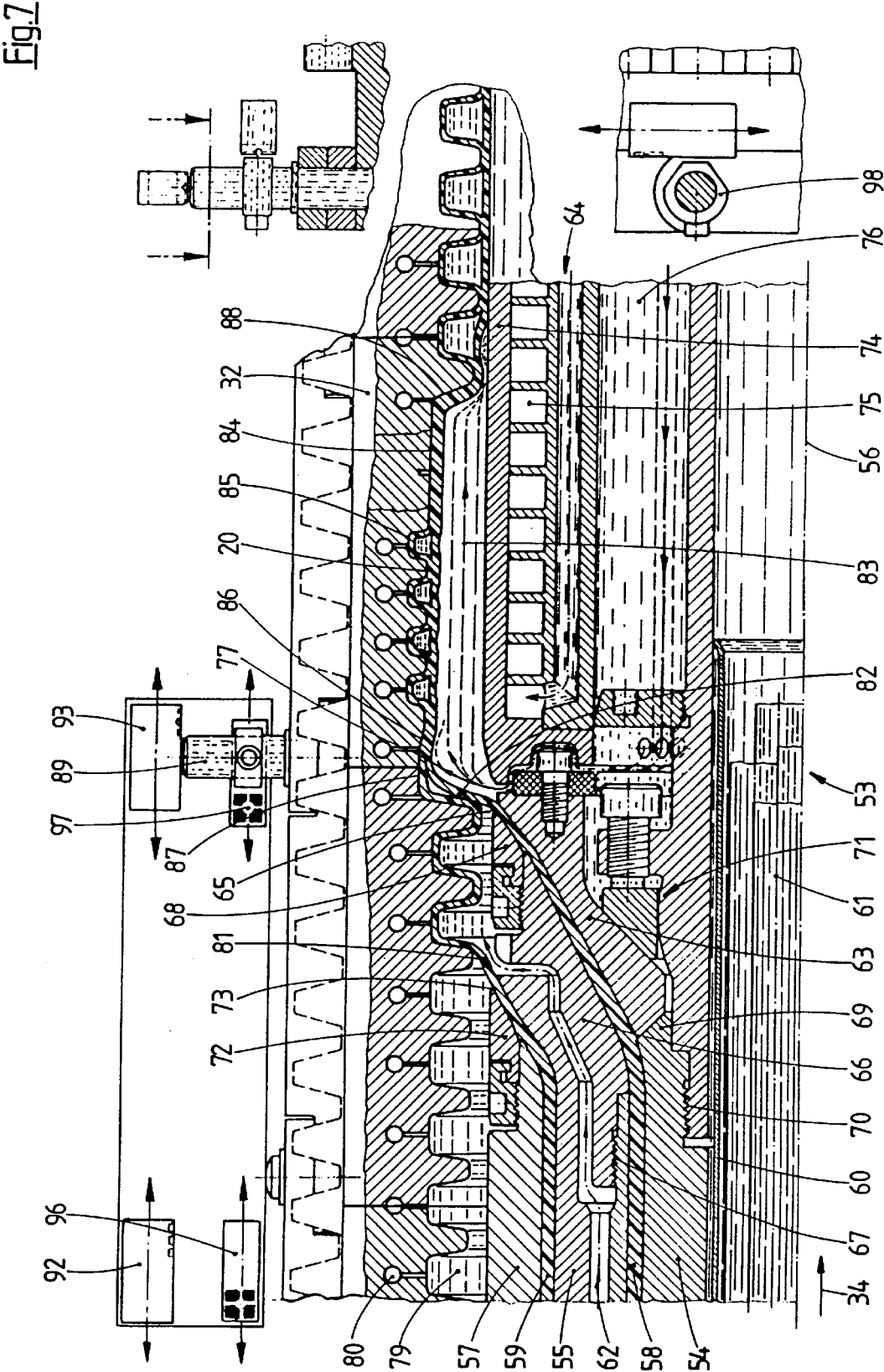
FIG. 7 is an illustration in accordance with FIG. 6 at the end of the production of the socket.

As seen in FIGS. 6 and 7, annular mold recesses 79 are formed in the half shells, of which only the half shells 32 are illustrated in these figures, and they are connected to partial vacuum channels 80 in known manner.

Part of the plastic melt supplied from the extruder flows through the external channel 59 to the external die 73, from which an external tube 81 is extruded which fits in the mold recesses 79 due to the partial vacuum. When cooled down and solidified correspondingly, it forms the corrugated external pipe 4.

Another part of the melt flows through the internal channel 58 to the internal die 65, from which another tube, namely an internal tube 82, is discharged and arrives on the sizing cylinder 74. The latter expands from the internal die 65 in the direction of production 34 slightly outwards until the internal tube 82 touches the bottom 9 of the corrugation troughs 8 of the external tube 81, where it is welded together with them. When cooled down and solidified, the internal tube 82 forms the internal pipe 3 of the pipe.

As seen in particular from FIGS. 6 and 7, the half shells 32, 32' are configured such that the sockets 10 and 10', respectively, are formed at given distances within the continuously produced composite pipe, i.e. between the pipe sections 1 and 2. To this end, a socket recess 83 is formed in a pair of half shells 32, 32', which is suited to the outer shape of the socket 10 and 10' to be produced and part of which has a smooth, substantially cylindrical wall 84. In the direction of production 34, this wall 84 is followed by a number of annular mold recesses 85, in which the external pipe section 18 of the composite pipe section 14 with its corrugation crests 19 is molded. A conical section 86 is formed before the annular mold recesses 85 seen in the direction of production 34, where an insertion section 16 of the respective socket 10 and 10' is molded. In the direction of production 34 this is followed by a mold section 87, in which a transition section 21 between a socket 10 and 10' and a pipe section 2 is molded.

Counter to the direction of production 34, the wall 84 of the socket recess 83 is followed by a mold section 88 which is adapted to the expanded section 12 between the pipe section 1 and its socket 10 and 10'.

By spatially fixed allocation to the socket recess 83, a control member 89 is formed by a rod-shaped elongation of a coupling bolt 36, which—in a manner still to be described—triggers various valves so as to produce varying pressure conditions in the space between the external tube 81 and the internal tube 82 and/or within the internal tube 82. To this end, a mounting bridge 90 is fixed to the bearing 50, having a mounting arm 91 which extends above the half shells 32' in the direction of production 34. Switches 92, 93 are provided on this mounting arm 91, which are to be operated by the control member 89 and by means of which solenoid valves 94, 95 can be triggered. Further, switches 96, 97 are operated by means of the control member 89, which are disposed on the mounting arm 91 and by means of which the drive motor (not shown) can be switched to varying speeds. As seen in FIGS. 6, 7, the switches 92, 93, 96, 97 are actuated contactlessly, the no-contact operation of the switches 96, 97 taking place by means of a control cam 98. The switches 92, 93, 96, 97 are arranged on the mounting arm 91 for adjustment in the direction of production 34, which is roughly outlined by arrows 99. Via lines 100, 101, 102, 103, the switches 92, 93, 96, 97 are connected with a control unit 104 which processes the signals coming from the switches 92, 93, 96, 97 and passes corresponding control signals to the solenoid valves 94, 95. Pressurized air at a pressure p is supplied to the solenoid valves 94, 95 from a pressure source, the pressure p being higher than the initial pressures, still to be explained, of the solenoid valves 94, 95.

The pressure in the split gas duct 77 and thus within the internal tube 82 is triggered by way of the solenoid valve 94, whereas the pressure in the gas ducts 82 and thus in the space between the external tube 81 and the internal tube 82 is triggered by the solenoid valve 95.

During the production of the normally corrugated composite pipe in the mold seen on the right in FIG. 6, a pressure p1 of approximately 1.05 to 1.35 bar, i.e. a slight overpressure of 0.05 to 0.35 bar, is applied to the split gas duct 77 by the solenoid valve 94. Simultaneously a pressure p2 of approximately 1.2 to 0.5 bar, i.e. equally a slight, but higher overpressure of 0.2 to 0.5 bar, is applied to the gas ducts 62. The slightly higher overpressure between the external tube 81 and the internal tube 82 serves to ensure that when the tubes 81, 82, which are welded together at the corrugation troughs 8, cool down to form the corrugated composite pipe, the internal tube 82 theoretically bulges outwards. When the tubes 81, 82 cool down to ambient temperature, atmospheric pressure will set in precisely.

When, in the instant illustrated in FIG. 6, the mold section 87 moves into the vicinity of the split gas duct 77, then the control member 89 arrives at the first switch 96 seen in the direction of production 34, which reduces the advance speed of the mold formed by the half shells 32, 32' so that—while the performance of the extruder remains the same—more melt per unit length of the composite pipe to be produced is supplied to the internal die 65 and the external die 73. As a result, the external tube 81 and the internal tube 82 become thicker, as seen in particular in FIG. 7. Simultaneously, the solenoid valve 95 is connected with atmosphere or a vacuum pump, respectively, so that atmospheric pressure or underpressure p3 prevails in the space between the external tube 81 and the internal tube 82 and the air can escape purposefully. Simultaneously, the solenoid valve 94 is switched from p1 to a higher pressure p4 of approximately 1.1 to 1.45 bar, i.e. to an overpressure as compared to atmospheric pressure of 0.1 to 0.45 bar. In this way, the internal tube 82 is forced outwards against the external tube 81.

The latter is pulled against the socket recess 83 by the partial vacuum of approximately 0.7 to 0.3 bar in the partial vacuum channels 80. The overpressure pressed in through the split gas duct 77 works from inside so that the external tube 81 and the internal tube 82, while resting on the mold section 87 and the conical section 86 of the socket recess 83, are welded together over the full surface. When, upon advance of the half shells 32, 32' in the direction of production 34, their annular mold recesses 85 arrive in the vicinity of the external die 73, then the external tube 81, due to the partial vacuum prevailing there too, is pressed into these mold recesses 85 by the atmospheric pressure p3 prevailing in the space between the external tube 81 and the internal tube 82, whereby the corrugation crests 19 of the composite pipe section 14 of the socket 10 and 10' are formed. The internal tube 82 is pressed only partially into these mold recesses 85, because whenever the internal tube 81 reaches a corrugation trough 20, the air cannot completely escape from the space between the external tube 81 and the internal tube 82 and the pressure p4 is selected such that the internal tube 82 is not completely pressed into the mold recesses 85. Therefore, the internal tube 82 and thus the internal pipe section 17 and 17' is not exactly smooth-walled in the vicinity of these mold recesses 85; however, the described composite pipe design, i.e. the box profile, is attained. The fact that this internal pipe section 17 and 17' is not exactly smooth-walled is of no importance, since centering and/or sealing takes place in the vicinity of the smooth-walled section 13 and 13'. When the smooth wall 84 of the socket recess 83, which is provided for smooth-walled section 13 and 13' to form, arrives in the vicinity of the external die 73, then and from thereon the smooth-walled section 13 and 13' of the socket 10 and 10' is produced in the way already explained for the insertion section 16.

At the end of the production of the socket 10, 10' according to FIG. 7, the control member 89 first reaches the switch 97 which switches the drive motor again to a higher speed so that less melt is supplied per unit length of the composite pipe produced. Directly afterwards the switch 93 is operated, changing the solenoid valve 94 and 95 down to the conditions described above with the pressures p1 and p2 prevailing. The transition section 21 produced in the mold section 87 is cut out.

The above pressure conditions have been specified for PVC (poly vinyl chloride) used as a material for the pipe to be manufactured. In the case of other materials, in particular polyolefines, these pressure conditions may change. Further, it is not necessary or reasonable in all cases to increase the supply of melt by reduction of the advance speed of the mold during the production of the socket 10 and 10'.

What is claimed is:

1. A composite pipe comprising a smooth internal pipe (3), an external pipe (4) alternately provided with first annular corrugation crests (5) and first annular corrugation troughs (8) each having a bottom (9), the internal pipe (3) and the external pipe (4) being welded together at the bottom (9) of the first corrugation troughs (8), the internal pipe (3) and the external pipe (4) forming a pipe section (1, 2) with a central longitudinal axis (25), and a socket (10,10') with a bottom (11), which socket (10,10') is molded on in-line at one end of the pipe section (1) and which at its bottom (11), adjoins the internal pipe (3) and the external pipe (4) of the pipe section (1) by an expanded section (12), subsequent to the expanded section (12), comprises a smooth-walled and substantially single-walled section (13, 13'), having a length a in the direction of the central longitudinal axis (25) which corresponds at least to the length of one and a half first corrugation crests (5) and one first corrugation trough (8) of the pipe section (1, 2) in the direction of the central longitudinal axis (25), subsequent to the smooth-walled section (13, 13'), is formed as a composite pipe section (14) having an internal pipe section (17, 17') and an external pipe section (18) with at least two second annular corrugation crests (19) which are smaller than the first annular corrugation crests (5), and subsequent to the composite pipe section (14), comprises an inlet (15).

2. A composite pipe according to claim 1, wherein the smooth-walled and single-walled section (13) is cylindrical.

3. A composite pipe according to claim 1, wherein the smooth-walled and single-walled section (13') widens conically from the composite pipe section (14) to the expanded section (12).

4. A composite pipe according to claim 3, wherein the smooth-walled and single-walled section (13') widens conically by half an aperture angle (1) to which $0° < i < 5°$ applies.

5. A composite pipe according to claim 2, wherein the internal pipe section (17) of the composite pipe section (14) widens conically in the direction towards the inlet (15).

6. A composite pipe according to claim 1, wherein $0.1\ f \leq e \leq 0.6\ f$ applies to a height e of the corrugation crests (19) of the composite pipe section (14) of the socket (10, 10') in relation to a height f of the corrugation crests (5) of the pipe sections (1, 2).

7. A composite pipe according to claim 1, wherein $0.2\ h \leq g \leq 0.8\ h$ applies to a spacing g of the corrugation crests (19) of the composite pipe section (14) in relation to a spacing h of the corrugation crests (5) of the pipe sections (1, 2).

8. A composite pipe according to claim 1, wherein $1.020 \geq c/b \geq 1.001$ applies to a smallest inside diameter c of the smooth-walled and single-walled section (13, 13') in relation to an outside diameter b of the pipe section (1, 2).

9. A composite pipe according to claim 1, wherein the socket (10, 10') is formed in-line with the pipe section (1, 2).

10. A composite pipe according to claim 1, wherein at least one catching cam (28) directed inwards is formed in the smooth-walled and single-walled section (13).

11. A composite pipe according to claim 1, wherein an insertion section (16) is formed between the composite pipe section (14) and the inlet (15).

* * * * *